(12) United States Patent
Suyama et al.

(10) Patent No.: US 7,375,440 B2
(45) Date of Patent: May 20, 2008

(54) VEHICLE ELECTRONIC KEY SYSTEM

(75) Inventors: Terumasa Suyama, Aichi (JP); Takashi Ichikawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 431 days.

(21) Appl. No.: 10/649,459

(22) Filed: Aug. 27, 2003

(65) Prior Publication Data
US 2004/0046452 A1 Mar. 11, 2004

(30) Foreign Application Priority Data
Aug. 29, 2002 (JP) .............................. 2002-251806

(51) Int. Cl.
B60R 25/00 (2006.01)
G05B 19/00 (2006.01)
G06F 7/04 (2006.01)
H04B 3/00 (2006.01)

(52) U.S. Cl. ...................... 307/10.2; 340/5.1; 340/5.2; 340/5.21

(58) Field of Classification Search ............... 307/10.2, 307/10.1, 9.1; 340/5.1, 5.2, 5.21
See application file for complete search history.

(56) References Cited

U.S. PATENT DOCUMENTS

| 5,525,977 | A | 6/1996 | Suman |
| 6,198,996 | B1 | 3/2001 | Berstis |
| 6,271,745 | B1 * | 8/2001 | Anzai et al. ............... 340/5.53 |
| 6,275,141 | B1 * | 8/2001 | Walter ....................... 340/5.64 |
| 6,281,599 | B1 * | 8/2001 | Murakami et al. ......... 307/10.2 |
| 6,376,930 | B1 * | 4/2002 | Nagao et al. ............... 307/10.2 |
| 6,683,391 | B1 * | 1/2004 | Enoyoshi et al. .......... 307/10.5 |
| 6,980,086 | B2 * | 12/2005 | Papp ......................... 340/10.4 |
| 2003/0117261 | A1 * | 6/2003 | Gunsch ..................... 340/5.25 |

FOREIGN PATENT DOCUMENTS

| DE | 198 42 544 A1 | 4/2000 |
| DE | 101 03 044 A1 | 7/2002 |
| EP | 1 216 900 A1 | 6/2002 |
| GB | EP 1 101 670 * | 5/2001 |
| JP | 62-156487 | 11/1987 |
| JP | 09-048323 | 2/1997 |
| JP | 09-161033 | 6/1997 |
| JP | 2003-064920 | 3/2003 |
| WO | WO 02/22407 A1 | 3/2002 |

OTHER PUBLICATIONS

European Search Report, Dec. 4, 2003.

* cited by examiner

*Primary Examiner*—Michael Sherry
*Assistant Examiner*—Michael Rutland-Wallis
(74) *Attorney, Agent, or Firm*—Patterson, Thuente, Skaar & Christensen, P.A.

(57) ABSTRACT

A vehicle electronic key system that may be lent to a third person without having to worry about how the key would be used. The key system includes a portable key and a control unit installed in a vehicle. When the vehicle owner does not want the third person to use a certain accessory, the owner registers a restriction code in the key. The restriction code is registered only when a fingerprint input from an input device matches the owner's fingerprint that is pre-registered in the key. The registration of the restriction code prohibits operation of the accessory.

15 Claims, 3 Drawing Sheets

VEHICLE ELECTRONIC KEY SYSTEM

BACKGROUND OF THE INVENTION

The present invention relates to an electronic key system for use in a vehicle, and more particularly, to an electronic key system including a portable electronic key for performing wireless communication with a vehicle control unit.

In the prior art, a door lock of a vehicle has a key cylinder having a keyhole in a door. A key is inserted in the keyhole and turned to lock or unlock the door. The key is also used to start the engine and open the trunk or glove compartment. Thus, when a vehicle owner lends the key to a third person, the third person may open the trunk or glove compartment against the owner's will.

SUMMARY OF THE INVENTION

It is an object of the present invention to provide an electronic key system that may be lent to a third person without having to worry about how the key would be used.

To achieve the above object, the present invention provides an electronic key system for use in a vehicle having an accessory. The electronic key system includes a electronic key, a control unit arranged in the vehicle to perform wireless communication with the electronic key. An input device is arranged in one of the electronic key and the vehicle to input identification information. A first verification device is connected to the input device to compare the input identification information with registered identification information. A restriction information generation device is connected to the first verification device. Operation restriction information for designating an operation of the vehicle and the accessory that is to be restricted is registerable in the restriction information generation device when the input individual identification information matches the registered individual identification information. A second verification device is arranged in the control unit and stores reference specific code. The second verification device compares specific code registered in the electronic key with the reference specific code. A restriction control device restricts the operation designated by the operation restriction information when the specific code matches the reference specific code.

Another aspect of the present invention is an electronic key system for use in a vehicle having a plurality of accessories. The electronic key system includes a communication circuit arranged in the vehicle to output a request signal by means of wireless communication, and a electronic key that communicates with the communication circuit. An input device is arranged in the electronic key for inputting individual identification information. A first verification device is connected to the input device to verify the input individual identification information with registered individual identification information of an authorized owner A restriction information generation device is connected to the first verification device. The restriction information generation device registers operation restriction information for designating at least one operation, which is to be restricted, among operations of the vehicle and the accessories when the input individual identification information and the registered individual identification information match, the operation restriction information being output by means of wireless communication from the electronic key in response to the request signal. A restriction control device is connected to the communication circuit and the accessories to receives the operation restriction information via the communication circuit and restricts the at least one operation designated by the operation restriction information.

A further aspect of the present invention is an electronic key system for use in a vehicle having a plurality of accessories. The electronic key system includes a communication circuit arranged in the vehicle to output a request signal by means of wireless communication, and a electronic key that communicates with the communication circuit. An input device is arranged in the vehicle for inputting individual identification information. A first verification device is connected to the input device to verify the input individual identification information with registered individual identification information of an authorized owner. A restriction information generation device is connected to the first verification device, The restriction information generation device registers operation restriction information for designating at least one operation, which is to be restricted, among operations of the vehicle and the accessories when the input individual identification information and the registered individual identification information match. A restriction control device is connected to the restriction information generation device and the accessories, receives the operation restriction information via the communication circuit, and restricts the at least one operation designated by the operation restriction information.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electronic key system 1 according to a first embodiment of the present invention will now be discussed.

Figure 2:
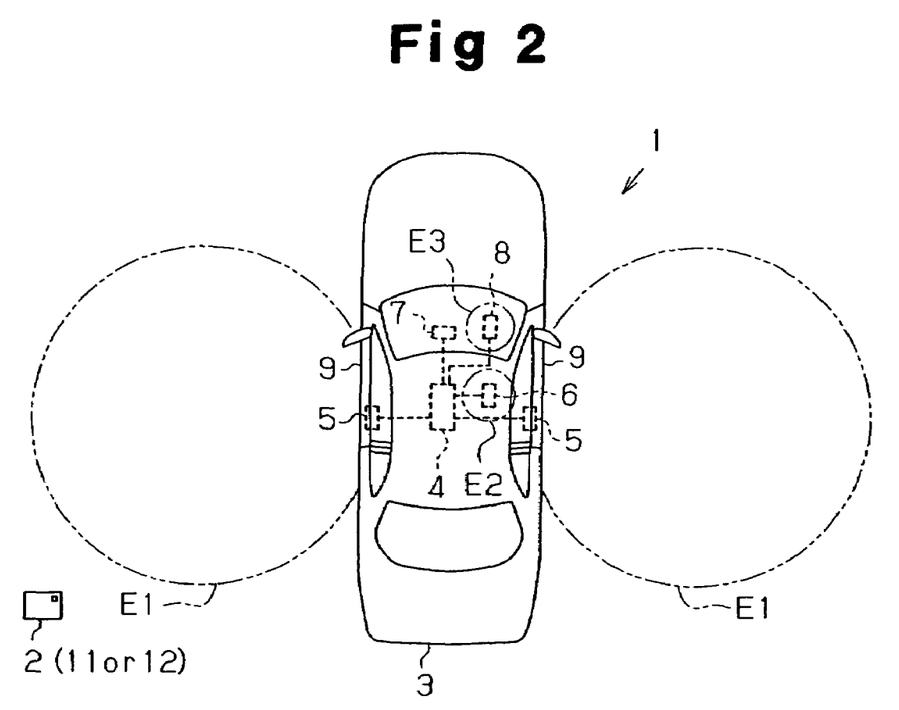
FIG. 2 is a schematic diagram of the electronic key system.

FIG. 2 is a schematic view of the electronic key system 1. The electronic key system 1 includes a card-type portable electronic key 2 and a control unit installed in a vehicle 3. Wireless communication is performed between the electronic key 2 and the control unit 4. The control unit 4 activates various devices in the vehicle 3 in accordance with radio wave signals that are transmitted to and received from the electronic key 2 via antennas 5 to 8, which are installed in the vehicle 3.

The antennas 5 are installed in the left and right doors 9. Each antenna 5 has an area E1 in which wireless communication with the electronic key 2 is possible. The antenna 7 is used for receiving signals, and the antenna 8 is used for an immobilizer. The antenna 8 has an area E3 in which wireless communication with the electronic key 2 is possible. The antennas 5 to 8 are connected to the control unit 4 by communication cables.

Figure 3A:
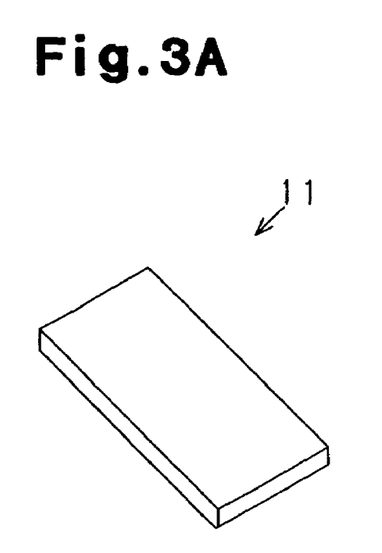
FIGS. 3A and 3B are perspective views, each showing an electronic key.
Figure 3B:
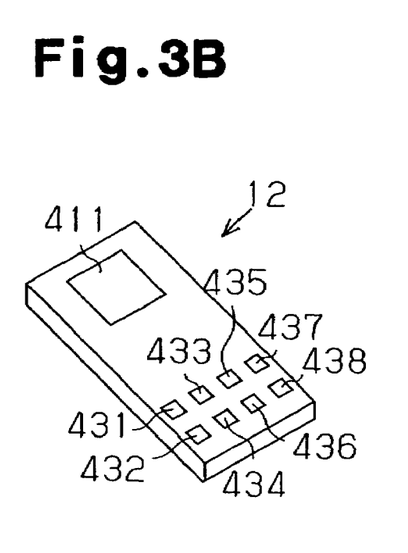

A master key 11 or a sub-key 12, which are respectively shown in FIGS. 3A and 3B, may be used as the electronic key 2. The owner (driver) of the vehicle 3 normally holds the master key 11. When lending the electronic key 2 to a third person, the owner lends the sub-key 12 to the third person.

Figure 1:
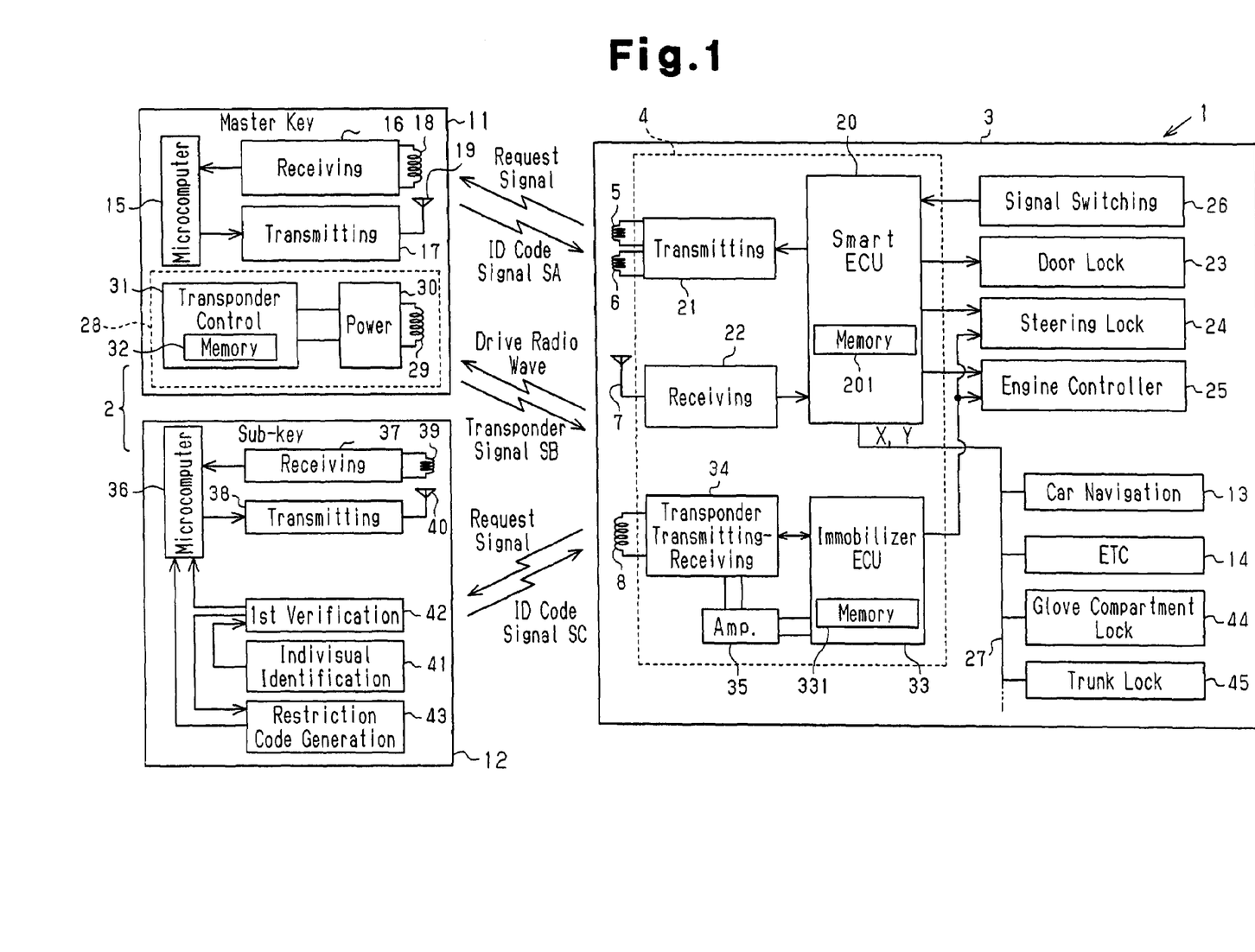
FIG. 1 is a block diagram of an electronic key system according to a first embodiment of the present invention.

FIG. 1 shows the electronic key system 1. The electronic key system 1 is a so-called smart key system provided with a keyless entry function. The electronic key system 1 automatically unlocks the vehicle door when the owner, who is holding the master key 11 approaches the door, and automatically locks the door when the owner moves away from the door. The electronic key system 1 also has an ignition function for starting the engine when the owner operates an ignition knob (not shown).

The master key 11 includes a microcomputer 15, a receiving circuit 16, and a transmitting circuit 17. A request signal transmitted from the vehicle 3 (control unit 4) is received by an antenna 18 and provided to the microcomputer 15 from the receiving circuit 16. In response to the request signal, the microcomputer 15 generates an ID code signal in accordance with an ID code of the master key 11. The transmitting circuit 17 transmits an ID code signal (radio wave) SA having a predetermined frequency from the master key 11 via an antenna 19.

The control unit 4 includes a smart ECU 20, a transmitting circuit 21, and a receiving circuit 22. The transmitting circuit 21 converts a request signal output from the smart ECU 20 to a radio wave having a predetermined frequency and transmits the converted request signal from the control unit 4 via the antennas 5 or 6. The receiving circuit 22 receives an ID code signal from outside the control unit 4 via the antenna 7, modulates the ID code signal to a pulse signal, and provides the pulse signal to the smart ECU 20.

The smart ECU 20 includes a CPU (not shown) and a memory 201. An ID code of the master key 11 and an ID code of the sub-key 12 are registered in the memory 201. In response to the ID code signal provided from the antenna 7, the smart ECU 20 verifies the ID code of the ID code signal with the ID code in the memory 201. In accordance with the code verification result, the smart ECU 20 operates a door lock drive device 23, a steering lock drive device 24, and an engine controller 25, which are provided in the vehicle 3.

A signal switching switch 26 is arranged in the vehicle and connected to the smart ECU 20. The signal switching switch 26 provides the smart ECU 20 with an OFF signal before the driver enters the vehicle 3. The signal switching switch 26 provides the smart ECU 20 with an ON signal when the driver opens the door 9, enters the vehicle 3, and closes the door 9. In response to the OFF signal from the signal switching switch 26, the smart ECU 20 transmits a first request signal from the antennas 5. In response to the ON signal from the signal switching switch 26, the smart ECU 20 transmits a second request signal from the antenna 6.

The operation of the smart key system will now be discussed.

In the state where the door 9 is locked, the signal switching switch 26 outputs the OFF signal. When the OFF signal is being provided, the smart ECU 20 intermittently transmits the first request signal from the antennas 5. When the driver who is holding the master key 11 enters any of the areas E1 (refer to FIG. 2) and the antenna 18 of the master key 11 receives the first request signal, the microcomputer 15 transmits an ID code SA from the antenna 19. In other words, the master key 11 is in a standby mode when the first request signal is not received and automatically returns the ID code SA to the control unit 4 only when receiving the first request signal.

The ID code SA is received by the antenna 7 and is provided to the smart ECU 20 via the receiving circuit 22. The smart ECU 20 verifies the ID code of the ID code signal SA with the ID code in the memory 201. When the received ID code matches the ID code of the memory 201 and the signal switching switch 26 is issuing the OFF signal, the smart ECU 20 operates the door lock drive device 23 and unlocks the door. If the received ID code does not match the ID code of the memory 201, the smart ECU keeps the door locked. In this manner, the smart entry function automatically unlocks the door.

Then, when the driver sits on the driver's seat and closes the door 9, the signal switching switch 26 outputs the ON signal. While the ON signal is being issued, the smart ECU 20 intermittently transmits the second request signal from the antenna 6. When the antenna 18 of the master key 11 receives the request signal in the area E2 (refer to FIG. 2), the microcomputer 15 transmits the ID code signal SA from the antenna 19. The ID code signal SA is received by the antenna 7 and is provided to the smart ECU 20 via the receiving circuit 22. The smart ECU 20 verifies the ID code of the ID code signal SA with the ID code registered in the memory 201. If the received ID code matches the ID code of the memory 201 when the signal switching switch 26 is issuing the ON signal, the smart ECU 20 enables the starting of the engine. More specifically, the smart ECU 20 drives the steering lock drive device 24 to unlock the steering wheel (not shown) and provides the engine controller 25 with an engine start enable signal. When the ignition knob is operated after the engine start enable signal is received, the engine controller 25 performs fuel injection and engine ignition to start the engine.

If the two ID codes do not match, the smart ECU 20 activates its immobilizer function and does not enable the starting of the engine even if the signal switching switch 26 is providing the ON signal. In other words, the smart ECU 20 does not provide the engine controller 25 with an engine start enable signal. In this case, the engine controller 25 does not perform fuel injection (or engine starting) to start the engine even if the ignition knob is operated. Accordingly, a third person who is not holding the master key 11 cannot start the engine.

A battery (not shown) powers the microcomputer 15 of the master key 11. Thus, when the battery drains, the master key 11 does not issue the ID code signal SA even if it receives the request signal. Thus, the code verification is disabled. However, the electronic key system 1 functions as an immobilizer system that compensates for the battery drainage of the master key 11.

The immobilizer system will now be discussed. The master key 11 has a transponder 28, which is configured by a single IC chip. The transponder 28 includes a coil antenna 29, a power circuit 30, and a transponder control circuit 31.

The antenna 29 receives a drive radio wave from the vehicle 3 in the area E3 (refer to FIG. 2). The power circuit 30 uses the electromagnetic field of the drive radio wave to generate power and supplies the power to the transponder control circuit 31. The transponder control circuit 31 has a memory 32. The memory 32 stores a transponder ID code. The transponder control circuit 31, which is powered by the power circuit 30, generates a transponder signal that is in accordance with the ID code, converts the transponder signal to a transponder signal (radio wave) SB, which has a predetermined frequency, and transmits the signal SB from the antenna 29.

The control unit 4 further includes an immobilizer ECU 33, a transponder transmitting-receiving circuit 34, and an amplification circuit 35. The transponder transmitting-receiving circuit 34 generates an electromagnetic field at the antenna 8 in accordance with a control signal provided from the immobilizer ECU 33 to transmit a drive signal. The transponder signal SB, which is transmitted from the master key 11, is received by the antenna 8 and is provided to the transponder transmitting-receiving circuit 34. The transponder transmitting-receiving circuit 34 demodulates the transponder signal SB to a pulse signal. The amplification circuit 35 amplifies and provides the demodulated signal to the immobilizer ECU 33.

The immobilizer ECU 33 includes a CPU (not shown) and a memory 331. The memory 331 stores a plurality of ID codes. The ID codes each correspond to a respective one of the master key 11 and the sub-key 12 used in the vehicle 3. When receiving the transponder signal via the antenna 8, the immobilizer ECU 33 verifies the ID code of the received transponder signal SB with the corresponding ID code of the memory 331. When the two ID codes match, the immobilizer ECU 33 provides the engine controller 25 with an encoded engine start enable signal. If the two ID codes do not match, the immobilizer ECU 33 does not provide the engine controller 25 with the engine start enable signal.

When the battery of the master key 11 drains, the immobilizer system functions in the following manner. When the driver gets into the vehicle and sits on the driver's seat, the master key 11 enters the area E3 (refer to FIG. 2). Thus, the antenna 29 of the transponder 28 receives the drive radio wave. In response to the drive radio wave, the transponder control circuit 31 is activated to automatically transmit the transponder signal SB from the antenna 29.

As a result, the transponder signal SB is provided to the immobilizer ECU 33 via the antenna 8, the transponder transmitting-receiving circuit 34, and the amplification circuit 35. The immobilizer ECU 33 verifies the ID code of the transponder signal SB with the corresponding ID code of the memory 331. The immobilizer ECU 33 doe not enable the starting of the engine when the received ID code does not match the ID code of the memory 331. Thus, the engine controller 25 forcibly cuts engine ignition and fuel injection and does not start the engine even if the ignition knob is operated. Accordingly, the immobilizer system prevents the starting of an engine through irregular operations, such as with a duplicate key or by hot-wiring the vehicle. The immobilizer system therefore has a high antitheft effect.

If the two ID codes match, the immobilizer ECU 33 enables the staring of the engine and provides the engine controller 25 with the engine start enable signal. That is, the smart ECU 20 drives the steering lock drive device 24 to unlock the steering wheel (not shown) and provides the engine controller 25 with the engine start enable signal. In this state, the starting of the engine is enabled. When the ignition knob is operated, the engine controller 25 ignites and starts the engine.

A car navigation system 13, an electronic toll collection (ETC) terminal 14, a glove compartment lock device 44, and a trunk lock device 45 are installed in the vehicle 3. In the following description, the car navigation system 13, the ETC terminal 14, the glove compartment lock device 44, and the trunk lock device 45 may be referred to as the accessories 13, 14, 44, and 45. The car navigation system 13 is a system for guiding the driver to a given destination. ETC is a non-stop automatic toll collection system that collects tolls without having to stop the vehicle at tollbooths on toll roads. The ETC terminal 14 communicates with tollbooths through antennas provided in the tollbooths. The smart ECU 20, the car navigation system 13, the ETC terminal 14, the glove compartment lock device 44, and the trunk lock device 45 are connected to one another through a vehicle LAN 27.

The sub-key 12 includes a microcomputer 36, a receiving circuit 37, and a transmitting circuit 38. An antenna 39 receives the request signal (radio wave) transmitted from the vehicle 3. The receiving circuit 37 provides the request signal to the microcomputer 36. In response to the request signal, the microcomputer 36 generates an ID code corresponding to the sub-key 12. The transmitting circuit 38 transmit an ID code signal (radio wave) SC having a predetermined frequency via an antenna 40. Thus, the sub-key operate the smart key system.

The sub-key 12 includes an individual indentification device 41, a first verification device 42, and a restriction code generation device 43. The individual indentification device 41, the first verification device 42, and the restriction code generation device 43 each includes a CPU (not shown) and a memory (not shown). Referring to FIG. 3B, the individual indentification device 41 includes a fingerprint reader 411, the individual indentification device 41 detects a fingerprint, or individual indentification information, and provides the individual indentification information to the first verification device 42. The individual indentification device 41 functions as an input device for the individual identification information.

Fingerprint information of an index finger (portion of finger corresponding to distal phalanx) is registered as individual identification information in the first verification device 42. The registered fingerprint is that of an authorized owner of the vehicle 3. When a fingerprint information is input to the individual identification device 41, the first verification device 42 verifies the input fingerprint information with the registered individual identification information. When the input fingerprint information matches the stored fingerprint information, the first verification device 42 provides the microcomputer 36 and the restriction code generation device 43 with a verification signal.

Referring to FIG. 3B, the restriction code generation device 43 includes touch switches 431, 432, 433, 434, 435, 436, 437, and 438, which are arranged on the surface of the sub-key 12. The touch switch 431 is operated to register operation restriction of the car navigation system 13. The touch switch 432 is operated to delete the operation restriction registration of the car navigation system 13. The touch switch 433 is operated to register operation restriction of the ETC terminal 14. The touch switch 434 is operated to delete the operation restriction registration of the ETC terminal 14. The touch switch 435 is operated to register unlocking restriction of the glove compartment lock device 44. The touch switch 435 is operated to delete the unlocking restriction registration of the glove compartment lock device 44. The touch switch 437 is operated to register unlocking restriction of the trunk lock device 45. The touch switch 438 is operated to delete the unlocking restriction registration of the trunk lock device 45.

In response to the verification signal from the first verification device 42, the restriction code generation device 43 enters a restriction registration mode for a predetermined time period. When the restriction code generation device 43 is in the restriction registration mode, the authorized owner can register codes (operation restriction information) for restricting functioning of the devices 13, 14, 44, or 45 by touching the associated touch switches 431 to 438 with a finger. For example, when the storing touch switches 431, 433, 435, and 437 are touched, the restriction code generation device 43 generates and stores restriction codes g1, g2, g3, and g4 respectively corresponding to the touch switches 431, 433, 435, and 437. Further, when the restriction code generation device 43 is in the restriction registration mode and the deletion touch switches 432, 434, 436, and 438 are touched, the restriction code generation device 43 deletes the stored restriction codes g1, g2, g3, and g4.

Combinations of the restriction codes g1, g2, g3, and g4 stored in the restriction code generation device 43 are registered as specific code in the sub-key 12. The number of combinations of the restriction codes g1, g2, g3, and g4 is fifteen. As listed below, the fifteen pieces of specific code are G1, G2, G3, G4, G5, G6, G7, G8, G9, G10, G11, G12, G13, G14, and G15.

G1: g1, g2, g3, g4
G2: g1, g2, g3
G3: g1, g2, g4
G4: g1, g3, g4
G5: g2, g3, g4
G6: g1, g2
G7: g1, g3
G8: g1, g4
G9: g2, g3
G10: g2, g4
G11: g3, g4
G12: g1
G13: g2
G14: g3
G15: g4

One of the fifteen types of reference specific code can be registered in the sub-key 12. The smart ECU 20 stores the fifteen types of reference specific code.

In response to the ID code provided from the master key 11, the smart ECU 20 sends access right information X to the accessories 13, 14, 44, and 45 via the vehicle LAN 27. In the first embodiment, the access right information X is information related with permission for using the accessories 13 and 14 and permission for unlocking the accessories 44 and 45.

The receiving circuit 37 of the sub-key 12 receives the request signal transmitted from the vehicle 3 via the antenna 39 and provides the request signal to the microcomputer 36. In response to the request signal, the microcomputer 36 generates an ID code signal corresponding to the ID code of the sub-key 12. In response to the request signal, the microcomputer 36 also generates one of specific code G1 to G15 in accordance with the restriction codes g1, g2, g3, and g4, which are registered in the restriction code generation device 43. The transmitting circuit 38 uses the specific code to generate and transmit a restriction information signal (radio wave), which has a predetermined frequency, from the antenna 40.

The smart ECU 20 compares the specific code of the restriction information signal from the sub-key 12 with the reference specific code registered in the smart ECU 20. The smart ECU 20 provides the accessories 13, 14, 44, and 45 with access right information Y, which is in accordance with the specific code comparison result, via the vehicle LAN 27. In the first embodiment, the access right information Y is information that does not permit usage of the accessories 13 and 14 or unlocking of the accessories 44 and 45. When the specific code is not received from the sub-key 12, the smart ECU 20 sends the access right information X to the accessories 13, 14, 44, and 45 via the vehicle LAN 27. The smart ECU 20 functions as a second verification device for verifying the specific code registered in the electronic key with the reference specific code prestored in the vehicle. The smart ECU 20 also functions as a restriction control device for restricting the accessories in accordance with the operation restriction information.

The output of the access right information X and Y from the smart ECU 20 will now be discussed.

When the driver possessing the master key 11 enters the areas E1 (refer to FIG. 2) and the smart ECU 20 receives the ID code of the master key 11, the smart ECU 20 unlocks the door and provides the vehicle LAN 27 with the access right information X. In accordance with the access right information X, usage of the accessories 13 and 14 is enabled, and unlocking of the accessories 44 and 45 is enabled.

When the driver possessing the sub-key 12 enters the areas E1 and the smart ECU 20 receives the ID code of the sub-key 12, the smart ECU 20 unlocks the door. When the smart ECU 20 receives the specific code from the sub-key 12, the smart ECU 20 provides the vehicle LAN 27 with the access right information Y.

For example, when the restriction codes g1, g2, g3, and g4 are stored in the restriction code generation device 43, the sub-key 12 outputs the specific code G1 (g1, g2, g3, and g4). In this case, the smart ECU 20 generates access right information Y that prohibits both usage of the accessories 13 and 14 and unlocking of the accessories 44 and 45.

When the restriction codes g2, g3, and g4 are stored in the restriction code generation device 43, the sub-key 12 outputs the specific code G5 (g2, g3, and g4). In this case, the smart ECU 20 generates access right information Y that enables usage of the accessory 13, prohibits usage of the accessory 14 and prohibits unlocking of the accessories 44 and 45.

When the restriction codes g3 and g4 are stored in the restriction code generation device 43, the sub-key 12 outputs the specific code G11 (g3 and g4). In this case, the smart ECU 20 generates access right information Y that enables usage of the accessories 13 and 14 and prohibits unlocking of the accessories 44 and 45.

When none of the restriction codes g1, g2, g3, and g4 is stored in the restriction code generation device 43, the sub-key 12 does not output the restriction information signal. In this case, the smart ECU 20 unlocks the door in accordance with the ID code signal SC from the sub-key 12 and provides the vehicle LAN 27 with the access right information X. As a result, regardless of the usage of the sub-key 12, the usage of the accessories 13 and 14 and the unlocking of the accessories 44 and 45 are enabled.

The first embodiment has the advantages described below.

(1) When using the sub-key 12, usage of the accessories 13 and 14 and unlocking of the accessories 44 and 45 may be selectively restricted by the smart ECU 20 and the immobilizer ECU 33. Accordingly, when the owner lends the sub-key 12 to a third person, the third person cannot perform selected operations of the accessories 13, 14, 44 and 45 that are not permitted by the owner. Thus, the owner may lend the electronic key to a third person without having to worry how the key may be used.

The owner of the master key 11 may register the specific code (operation restriction information) as required. Thus, the owner may change the operation restriction information in accordance with the person who the owner is lending the sub-key 12 to.

(2) The person who is holding the key is recognized from a distinctive bodily feature (individual identification information), such as a fingerprint or a palm print. The individual identification information is the optimal information for identifying the owner of the electronic key. Fingerprints are especially optimal for use as information for identifying the owner of the master key 11.

(3) The sub-key 12 incorporates the individual identification device 41, which detects fingerprints, the first verification device 42, and the restriction code generation device 43. Thus, the owner of the master key 11 is required only to hold the sub-key 12 and select or set the operation restriction information as required. This enables the owner to set the operation restriction information easily and quickly.

Figure 4:
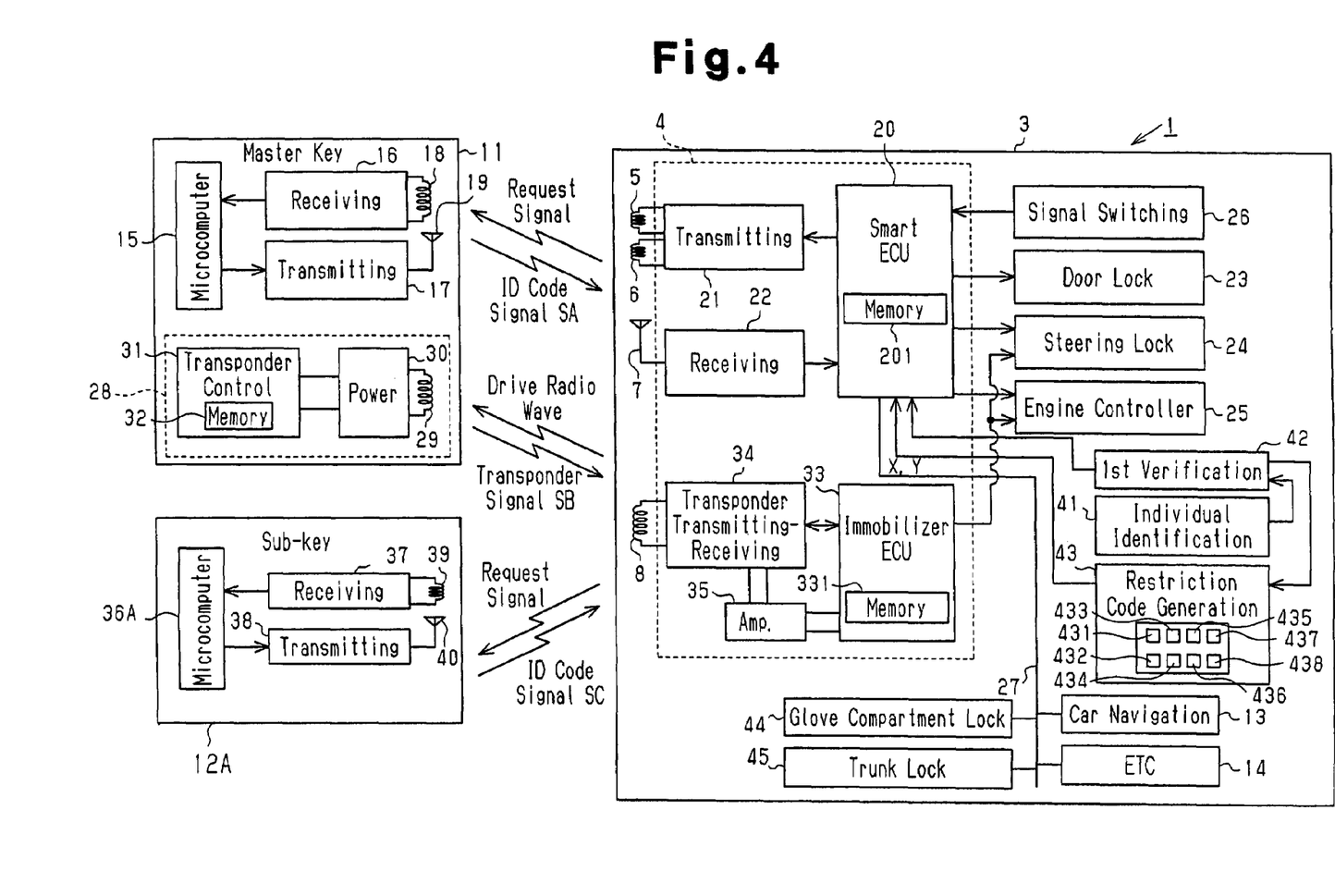
FIG. 4 is a block diagram of an electronic key system according to a second embodiment of the present invention.

A second embodiment of the present invention will now be discussed with reference to FIG. 4. Like or same reference numerals are given to those components that are the same as the corresponding components of the first embodiment.

In the second embodiment, the individual identification device 41, the first verification device 42, and the restriction code generation device 43 are arranged in the vehicle 3. The first verification device 42 and the restriction code generation device 43 are connected to a smart ECU 20A. The individual identification device 41, the first verification device 42, and the restriction code generation device 43 function in the same manner as in the first embodiment. When the first verification device 42 provides the restriction code generation device 43 with a verification signal, the restriction code generation device enters a restriction command standby mode for a predetermined time period. When the restriction code generation device 43 is in the restriction command standby mode, the authorized owner touches the touch switches 431 to 438 with a finger. This registers commands for restricting functions associated with the touch switches 431 to 438 that were touched. For example, when the storing touch switches 431, 433, 435, and 437 are touched, the restriction code generation device 43 generates and stores restriction codes g1, g2, g3, and g4 respectively corresponding to the touch switches 431, 433, 435, and 437. Further, when the restriction code generation device 43 is in the restriction command standby mode and the deletion touch switches 432, 434, 436, and 438 are touched, the restriction code generation device 43 deletes the stored restriction codes g1, g2, g3, and g4.

A sub-key 12A includes a microcomputer 36A, a receiving circuit 37, and a transmitting circuit 38. An antenna 39 receives a request signal (radio wave) transmitted from the vehicle 3. The receiving circuit 37 provides the request signal to the microcomputer 36. In response to the request signal, the microcomputer 36A generates an ID code corresponding to the sub-key 12A. The transmitting circuit 38 transmits an ID code signal (radio wave) SC having a predetermined frequency via an antenna 40. Thus, the sub-key 12A functions in the same manner as the master key 11 to operate the smart key system.

In response to the ID code signal SC from the sub-key 12A, the smart ECU 20A verifies the ID code of the sub-key 12A with the ID code stored in a memory 201 of the ECU 20A. The smart ECU 20A outputs the access right information X or Y in accordance with the verification result to the accessories 13, 14, 44, and 45 via the vehicle LAN 27.

The output of the access right information X and Y from the smart ECU 20A will now be discussed.

When the driver possessing the master key 11 enters the areas E1 (refer to FIG. 2), the smart ECU 20A unlocks the door and provides the vehicle LAN 27 with the access right information X when receiving the ID code of the master key 11. The access right information X enables usage of the accessories 13 and 14 and unlocking of the accessories 44 and 45.

When the driver possessing the sub-key 12 enters the area E1, the smart ECU 20A verifies the ID code received from the sub-key 12A with the ID code registered in the memory 201. When the ID code received from the sub-key 12A matches the registered ID code, the smart ECU 20A provides the vehicle LAN 27 with the access right information Y in the following manner. For example, when the restriction codes g2, g3, and g4 are stored in the restriction code generation device 43, the access right information Y enables usage of the accessory 13, prohibits usage of the accessory 14, and prohibits unlocking of the accessories 44 and 45. When the restriction codes g3 and g4 are stored in the restriction code generation device 43, the access right information Y enables usage of the accessories 13 and 14 and prohibits unlocking of the accessories 44 and 45.

When none of the restriction codes g1, g2, g3, and g4 is stored in the restriction code generation device 43, the smart ECU 20A provides the vehicle LAN 27 with the access right information X. As a result, regardless of the usage of the sub-key 12, the usage of the accessories 13 and 14 and the unlocking of the accessories 44 and 45 are enabled.

In the second embodiment, the ID code of the sub-key 12A serves as the specific code. The ID code of the sub-key 12A registered in the smart ECU 20A serves as the reference restriction code, which is pre-registered in the vehicle 3. The smart ECU 20A functions as a second verification device for verifying the specific code of the electronic key with the reference specific code stored in the vehicle. The smart ECU 20A also functions as a restriction control device for restricting the accessories in accordance with operation restriction information.

The second embodiment has advantages (1) and (2) of the first embodiment.

It should be apparent to those skilled in the art that the present invention may be embodied in many other specific forms without departing from the spirit or scope of the invention. Particularly, it should be understood that the present invention may be embodied in the following forms.

The restriction code generation device 43 may be arranged in the vehicle, and the individual identification device 41 and the first verification device 42 may be arranged in the electronic key. In this case, the verification result received from the verification device 42 is sent to the smart ECU 20A by means of wireless communication between the electronic key and the vehicle. When the first verification device 42 verifies the electronic key, the restriction code generation device 43 validates the setting of the operation restriction information.

The individual identification information does not have to be a fingerprint and may be other distinctive bodily features, such as a palm print.

A personal identification number (PIN) may be used as the individual identification information. In such a case, a PIN input device, such as a keypad, may be used as a device for inputting individual identification information.

The sub-key 12 may issue a transponder signal to activate the immobilizer system so that the immobilizer ECU 33 generates access right information instead of the smart ECUs 20 and 20A.

The present invention may also be applied to restrict unlocking of the steering wheel with the steering lock drive device 24 or to restrict starting of the engine with the engine controller 25.

The master key 11 of the first embodiment may incorporate the individual identification device 41, the first verification device 42, and the restriction code generation device 43.

The electronic key does not have to be a card type key and may be a key having the conventional key plate.

The type of the vehicle 3 is not limited and may be, for example, a two-wheel vehicle or an industrial vehicle.

The present examples and embodiments are to be considered as illustrative and not restrictive, and the invention is not to be limited to the details given herein, but may be modified within the scope and equivalence of the appended claims.

What is claimed is:

1. An electronic key system for use in a vehicle having an accessory, the electronic key system comprising:
    an electronic key;
    a control unit arranged in the vehicle to perform wireless communication with the electronic key;
    an user operable input device arranged in one of the electronic key and the vehicle to input identification information to the electronic key;
    a first verification device arranged in the electronic key and operable to compare the input identification information with pre-registered identification information;
    a restriction information generation device arranged in the electronic key and connected to the first verification device, wherein when the input identification information matches the pre-registered identification information, operation restriction information for designating an operation of the vehicle and the accessory that is to be restricted is registerable by a user in the restriction information generation device, and wherein the restriction information generation device generates specific code corresponding to the operation restriction information registered in the electronic key, and the electronic key wirelessly outputs the specific code corresponding to the operation restriction information registered in the electronic key regardless of what person is carrying the electronic key;
    a second verification device arranged in the control unit and storing reference specific code, wherein the second verification device receives and compares the specific code registered in the electronic key with the reference specific code; and
    a restriction control device for restricting the operation designated by the operation restriction information corresponding to the specific code when the specific code matches the reference specific code.

2. The electronic key system according to claim 1, wherein the input device is an individual identification device for detecting a distinctive bodily feature of an individual, and the pre-registered identification information is a pre-registered distinctive bodily feature, and wherein the first verification device compares the distinctive bodily feature detected by the individual identification device with the pre-registered distinctive bodily feature to determines whether the detected distinctive bodily feature matches the pre-registered distinctive bodily feature.

3. The electronic key system according to claim 2, wherein the distinctive bodily feature is a fingerprint.

4. The electronic key system according to claim 2, wherein the electronic key system included a master key and a sub-key, which is used in lieu of the master key.

5. The electronic key system according to claim 4, wherein the sub-key includes the restriction information generation device.

6. The electronic key system according to claim 5, wherein the sub-key includes the individual identification device and the first verification device.

7. The electronic key system according to claim 1, wherein the user operable input device is arranged in the vehicle.

8. An electronic key system for use in a vehicle having a plurality of accessories, the electronic key system comprising:
    a communication circuit arranged in the vehicle to output a request signal by means of wireless communication;
    an electronic key that wirelessly communicates with the communication circuit;
    an user operable input device arranged in the electronic key for inputting individual identification information to the electronic key;
    a first verification device arranged in the electronic key and connected to the input device, the first verification device being configured to store registered individual identification information of an authorized owner, receive the input individual identification information, and to verify the input individual identification information with the registered individual identification information of an authorized owner;
    a restriction information generation device arranged in the electronic key and connected to the first verification device, wherein operation restriction information for designating at least the operation, which is to be restricted, among operations of the vehicle and the accessories is registerable by a user in the restriction information generation device when the input individual identification information and the registered individual identification information match, the operation restriction information being output by means of wireless communication from the electronic key the restriction information generation device generating specific code corresponding to the operation restriction information registered in the electronic key and the electronic key wirelessly outputting the specific code corresponding to the operation restriction information registered in the electronic key in response to the request signal regardless of what person is carrying the electronic key; and
    a restriction control device arranged in the vehicle and connected to the communication circuit and the accessories to receive the specific code corresponding to operation restriction information via the communication circuit and restricting the at least one operation designated by the operation restriction information corresponding to the specific code.

9. The electronic key system according to claim 8, wherein the electronic key has an ID code and outputs the ID code by means of wireless communication when receiving the request signal, and the restriction control device unlocks a door of the vehicle when the door of the vehicle is locked and the received ID code is an authorized one.

10. The electronic key system according to claim 8, wherein the individual identification information is a fingerprint.

11. The electronic key system according to claim 8, wherein the electronic key is a sub-key, which is used in lieu of a master key.

12. The electronic key system according to claim 1, wherein the accessory is arranged in the vehicle and connected to a vehicle local area network (LAN), and the restriction control device sends access right information via the vehicle LAN.

13. The electronic key system according to claim 1, wherein the specific code is one of a plurality of specific codes, each specific code depending on a combination of restriction codes registered in the electronic key, and wherein when no restriction code is registered the restriction control device outputs access right information to permit use of the vehicle and the accessory.

14. The electronic key system according to claim 8, wherein the accessories are arranged in the vehicle and connected to a vehicle local area network (LAN), and the restriction control device sends access right information via the vehicle LAN.

15. The electronic key system according to claim 8, wherein the specific code is one of a plurality of specific codes, each specific code depending on a combination of restriction codes registered in the electronic key, and wherein when no restriction code is registered the restriction control device outputs access right information to permit use of the vehicle and the accessions.

* * * * *